United States Patent
Hall

(10) Patent No.: US 7,458,744 B2
(45) Date of Patent: Dec. 2, 2008

(54) SHELVING SYSTEM

(75) Inventor: Gregory W. Hall, Jacobus, PA (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 10/917,000

(22) Filed: Aug. 12, 2004

(65) Prior Publication Data

US 2005/0036830 A1 Feb. 17, 2005

Related U.S. Application Data

(60) Provisional application No. 60/494,609, filed on Aug. 12, 2003.

(51) Int. Cl.
F16B 7/08 (2006.01)
A47B 43/00 (2006.01)

(52) U.S. Cl. .................................. 403/187; 211/193

(58) Field of Classification Search ................ 403/187, 403/192, 194, 240, 201, 382; 211/192, 193, 211/182; 108/107, 147.17, 147.16, 147.13, 108/147.14; D8/331
See application file for complete search history.

(56) References Cited

U.S. PATENT DOCUMENTS

| 717,316 | A | | 12/1902 | Avery | |
|---|---|---|---|---|---|
| 963,585 | A | * | 7/1910 | Kimball | 403/231 |
| 1,848,085 | A | * | 3/1932 | Eisenschmidt | 403/187 |
| 3,212,648 | A | * | 10/1965 | Baker, Jr. et al. | 211/193 |
| 3,602,374 | A | * | 8/1971 | Alabaster | 211/193 |
| 3,727,358 | A | * | 4/1973 | Howell | 52/169.1 |
| 3,833,201 | A | | 9/1974 | Dill | |
| 4,065,218 | A | | 12/1977 | Biggane | |
| 4,078,664 | A | | 3/1978 | McConnell | |
| 4,141,525 | A | * | 2/1979 | Miller | 248/251 |
| 4,142,638 | A | * | 3/1979 | Vargo | 211/187 |
| 4,289,290 | A | * | 9/1981 | Miller | 248/251 |
| 4,317,523 | A | * | 3/1982 | Konstant et al. | 211/187 |
| 4,414,785 | A | * | 11/1983 | Howell | 52/169.1 |
| 4,444,323 | A | * | 4/1984 | Travis | 211/193 |
| D302,240 | S | | 7/1989 | Zell | |
| D329,799 | S | * | 9/1992 | Conklin | D8/331 |
| 5,215,290 | A | * | 6/1993 | Khalessi | 256/19 |
| 5,284,311 | A | * | 2/1994 | Baer | 248/243 |
| 5,383,723 | A | | 1/1995 | Meyer | |
| 5,628,415 | A | | 5/1997 | Mulholland | |
| 6,123,033 | A | * | 9/2000 | Polley et al. | 108/107 |

(Continued)

OTHER PUBLICATIONS

Zell Brothers shelf support drawing LN-460 (Dec. 4, 1992).
Zell Brothers shelf support drawing LN-461 (Nov. 23, 1992).

*Primary Examiner*—Victor MacArthur
(74) *Attorney, Agent, or Firm*—Michael Best & Friedrich LLP

(57) ABSTRACT

A connector is provided for coupling a member or a shelf to a support oriented in a substantially vertical direction. The connector can have a first receiving space for receiving the support, and a second receiving space for receiving the cross brace or the shelf, and can have one or more projections extending into the first receiving space and into corresponding apertures in the support. The connector may have opposing lateral walls on opposite sides of the first and second receiving spaces. The first and second receiving spaces can be separated by another wall extending between and coupling the lateral walls.

2 Claims, 4 Drawing Sheets

U.S. PATENT DOCUMENTS

| | | | |
|---|---|---|---|
| 6,230,466 B1 * | 5/2001 | Pryor | 52/702 |
| 6,257,427 B1 | 7/2001 | Schneid | |
| 6,719,481 B2 * | 4/2004 | Hoffmann | 403/403 |
| 2002/0054788 A1 * | 5/2002 | Hoffmann | 403/403 |

* cited by examiner

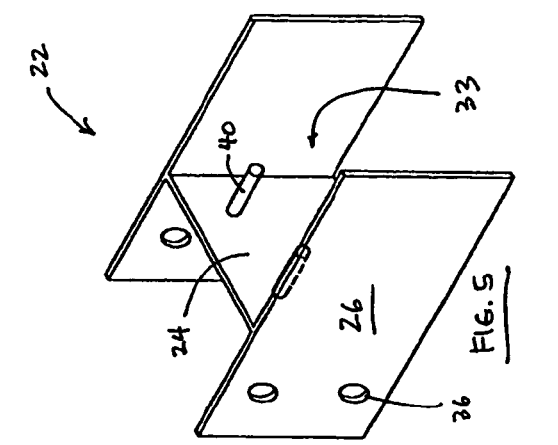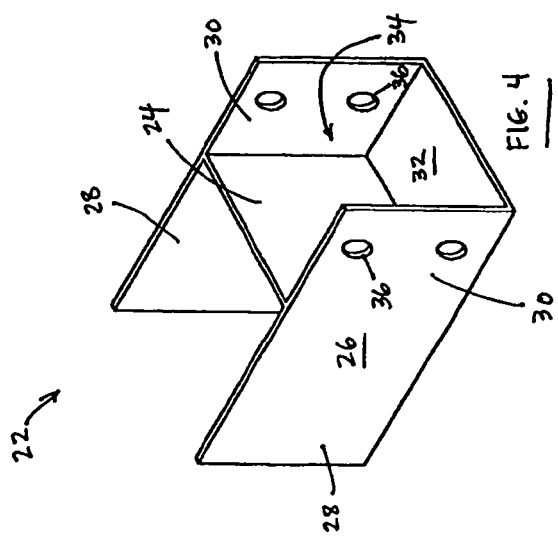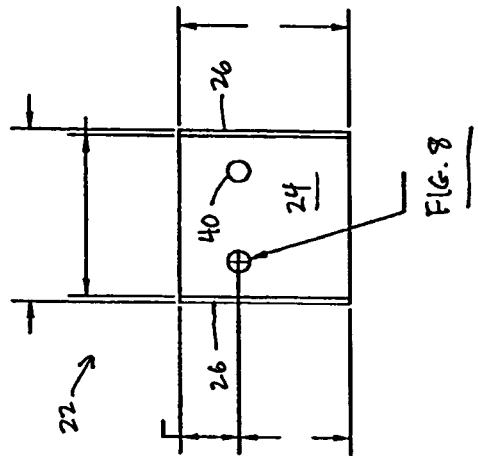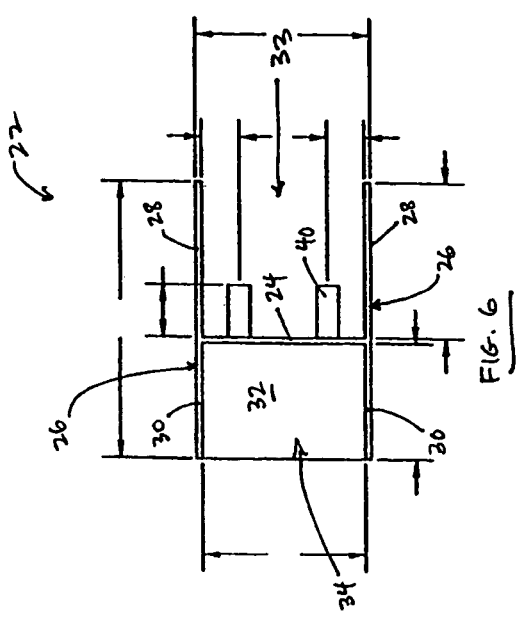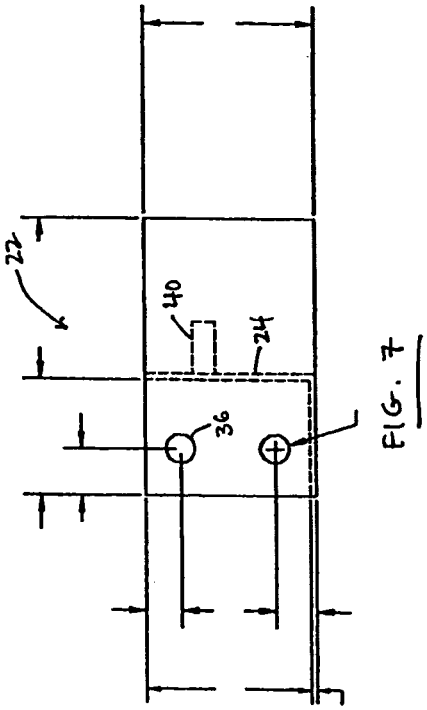

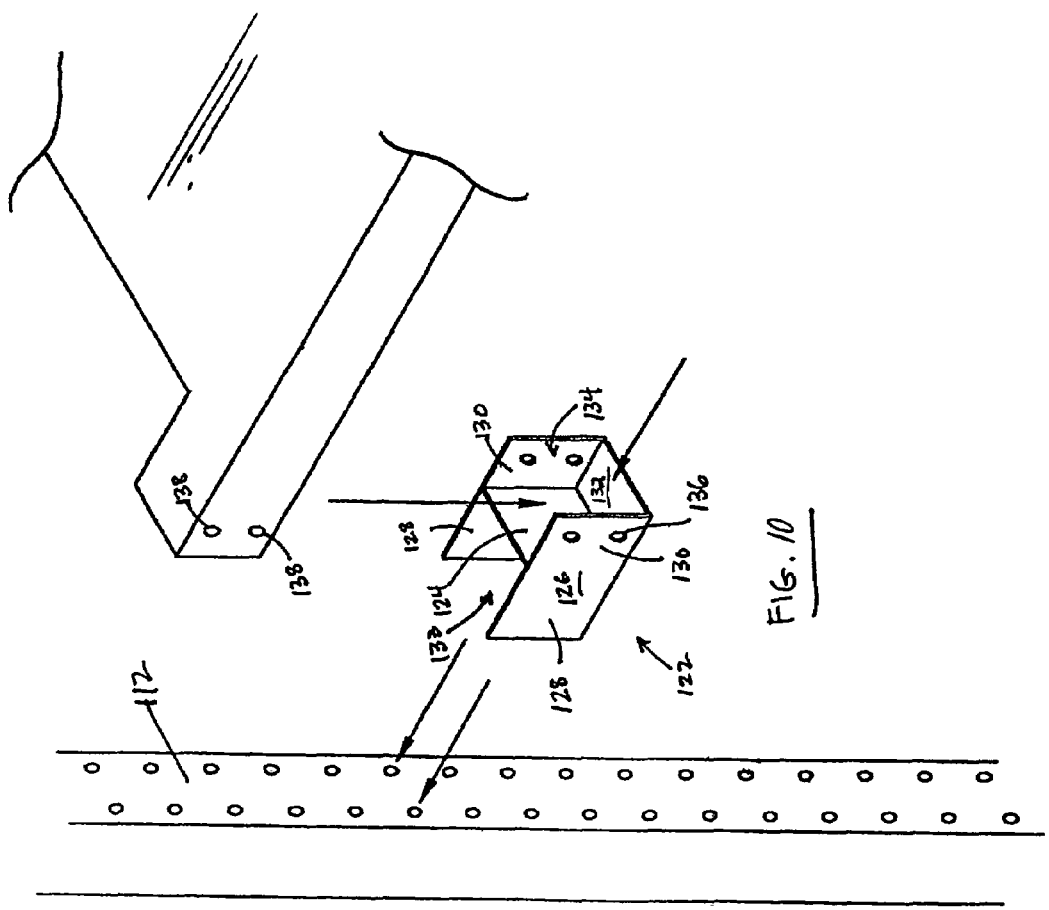
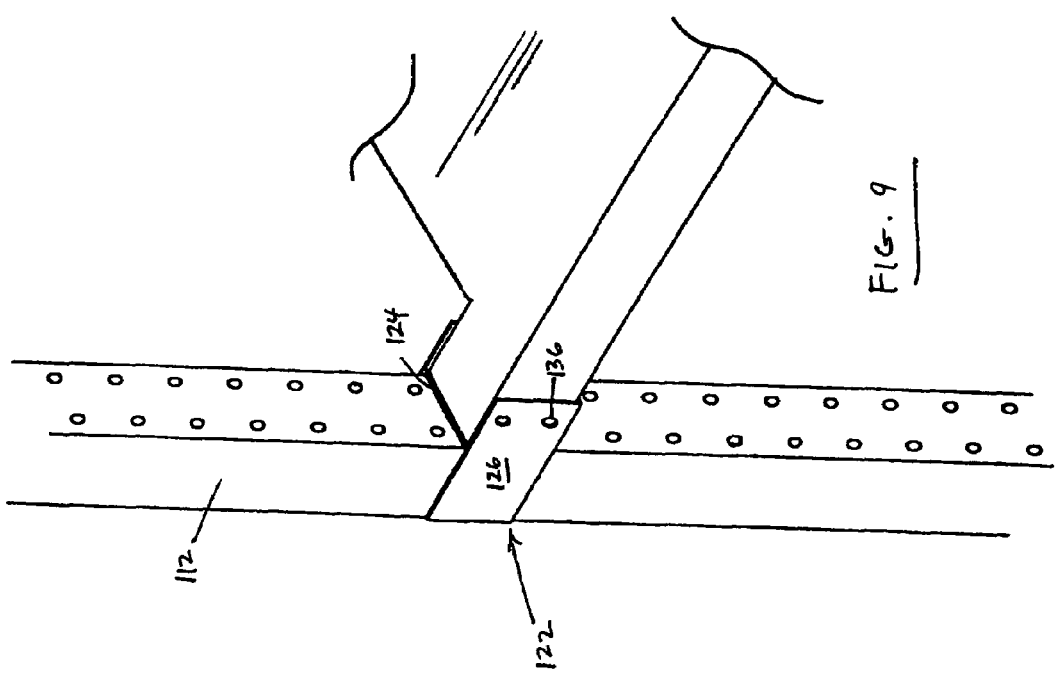

SHELVING SYSTEM

CROSS REFERENCE TO RELATED APPLICATIONS

Priority is hereby claimed to U.S. provisional patent application Ser. No. 60/494,609 filed on Aug. 12, 2003, the entire contents of which are incorporated herein by reference.

BACKGROUND OF THE INVENTION

The present invention relates to shelving and particularly to a method and structure for holding parts of a shelving system together. More particularly, the present invention relates to the connection between a cross brace or shelf and a vertical support column of a shelving frame.

Conventional shelving systems include frame systems that support a plurality of horizontally spaced shelves. Typically, the frames of the shelving systems include vertical support members or columns connected by horizontal cross braces. In conventional systems, a plurality of horizontal cross braces are permanently coupled between two vertical support columns at various heights along the columns. In a typical system, shelves are often secured to some of the permanently affixed cross braces. The cross braces provide front-to-back rigidity to the system and the shelves secured to the cross braces provide side-to-side, or lateral, rigidity. Additionally, a plurality of adjustable clips can be moveably positioned at various heights along the vertical support columns to support shelves at any desired location within the frame. However, shelves supported by conventional adjustable clips add little, if any, rigidity to the system.

In a conventional shelving system, the permanently-affixed cross braces are necessary to give the shelving system sufficient rigidity. In particular, some states require certain rigidity levels to meet seismic requirements. However, horizontal cross braces may be positioned at inconvenient locations along the height of the vertical support members for some end users. A cross brace's location may not precisely correspond to a location at which an end user desires to position a shelf. As a result, an end user may want to remove a shelf from a permanently affixed cross brace if a shelf at that location is not desired. This may compromise the structural integrity of the shelving system.

SUMMARY OF THE INVENTION

A cross brace and connector that is adjustable to meet the shelving requirements of an end user, but that also supplies the necessary rigidity to meet certain seismic requirements, would be welcomed by users of such shelving systems.

According to some embodiments of the present invention, a connector for coupling a cross brace to a vertical shelving column is provided, wherein the vertical shelving column has a surface including a plurality of indexing holes. The connector can include a central wall oriented substantially parallel to the surface of the vertical shelving column, and two lateral walls that are substantially perpendicular to the central wall and extend from opposite edges of the central wall to form first and second connector portions. A projection can extend from the central wall in the first portion of the connector. In some embodiments, at least one bolt hole, one each in each of the second portions of the lateral walls, are substantially aligned along an axis that is substantially perpendicular to the lateral walls.

Additional features and advantages of the invention will become apparent to those skilled in the art upon consideration of the following detailed description exemplifying the best mode of carrying out the invention as presently perceived.

BRIEF DESCRIPTION OF THE DRAWINGS

The detailed description particularly refers to the accompanying figures in which:

FIG. 4 is a perspective view of the connector of FIG. 2;

FIG. 5 is a perspective view of the connector, similar to FIG. 4, but taken from an opposite direction;

FIG. 6 is a top view of the connector of FIG. 2 showing two projections projecting from a central wall of the connector;

FIG. 7 is a cross-sectional view of the connector of FIG. 2;

FIG. 8 is an end view of the connector of FIG. 2, looking at the projections;

FIG. 9 is a perspective view of a shelf coupled to one of the vertical support columns using a connector; and FIG. 10 is an exploded perspective view, similar to FIG. 9, showing the shelf, connector, and vertical support column.

The present invention is not limited in its application to the details of construction and the arrangement of components set forth in the following description or illustrated in the following drawings. The invention is capable of other embodiments and of being practiced or of being carried out in various ways. Also, the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected," "coupled," and "mounted" are used broadly and encompass both direct and indirect connections, couplings, and mountings. In addition, the terms "connected" and "coupled" are not restricted to physical or mechanical connections or couplings.

DETAILED DESCRIPTION

Figure 1:
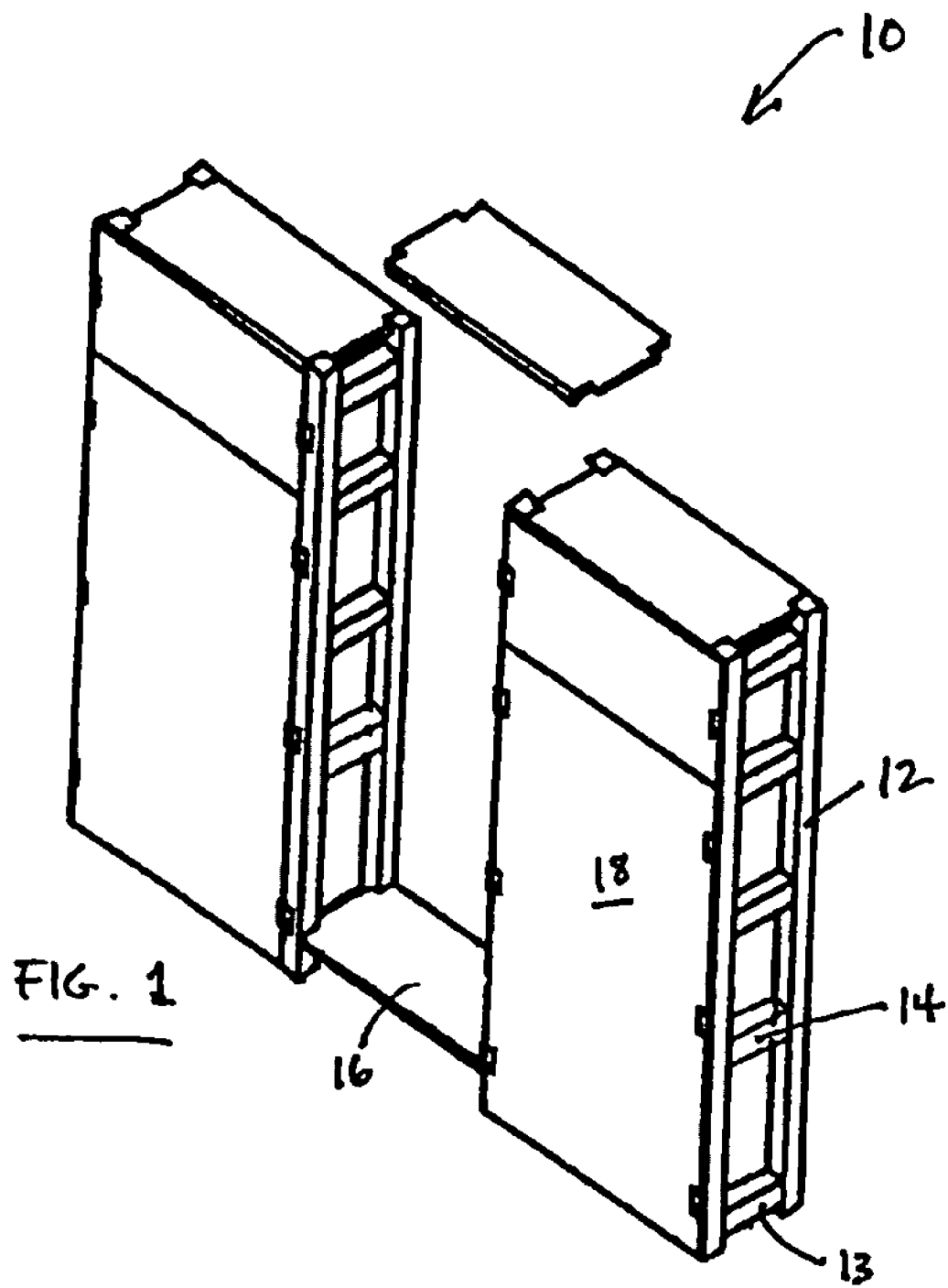
FIG. 1 is a rear perspective view of a shelving system according to the present invention, showing a bottom shelf supported on each end by a cross brace connecting vertical support columns of the shelving system.

Referring to FIG. 1, a shelving system 10 according to the present invention can include a plurality of vertical support columns or members 12 coupled to each other by a plurality of permanently affixed horizontal cross braces 13 and/or a plurality of adjustable horizontal cross braces 14. In this way, a series of "ladders" are created to support a plurality of shelves 16. The shelves 16 may be screwed, bolted or otherwise attached to any of the permanent or adjustable cross braces 13, 14, as will be readily apparent to those skilled in the art. The permanent cross braces 13 can provide front-to-back rigidity to the shelving system 10. A shelf screwed or otherwise attached to either a permanent or adjustable cross brace 13, 14 can also provide side-to-side, or lateral, rigidity to the shelving system 10. Therefore, if a user does not desire a shelf to be located at the precise height of a permanent cross brace 13, an adjustable cross brace 14 can be attached to vertical support columns 12 at a desired height, as will be described in further detail below. Shelves may also be supported within the shelving system 10 by adjustable clips (not shown) attached to the vertical support columns 12. In some embodiments, a back panel 18 is secured to the support columns 12 using suitable fasteners (e.g., staples, nails, etc.), as will be readily apparent to those of ordinary skill in the art.

Figure 3:
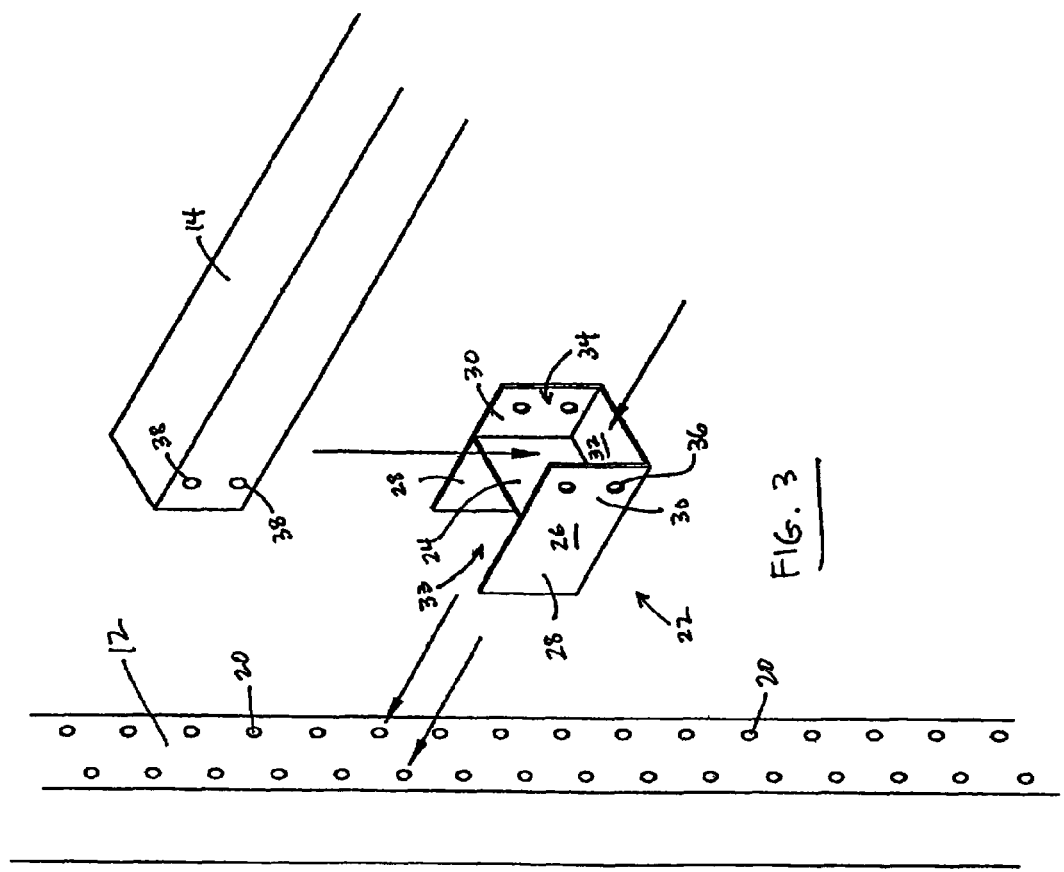
FIG. 3 is an exploded perspective view, similar to FIG. 2, showing the cross brace, connector, and vertical support column.
Figure 2:
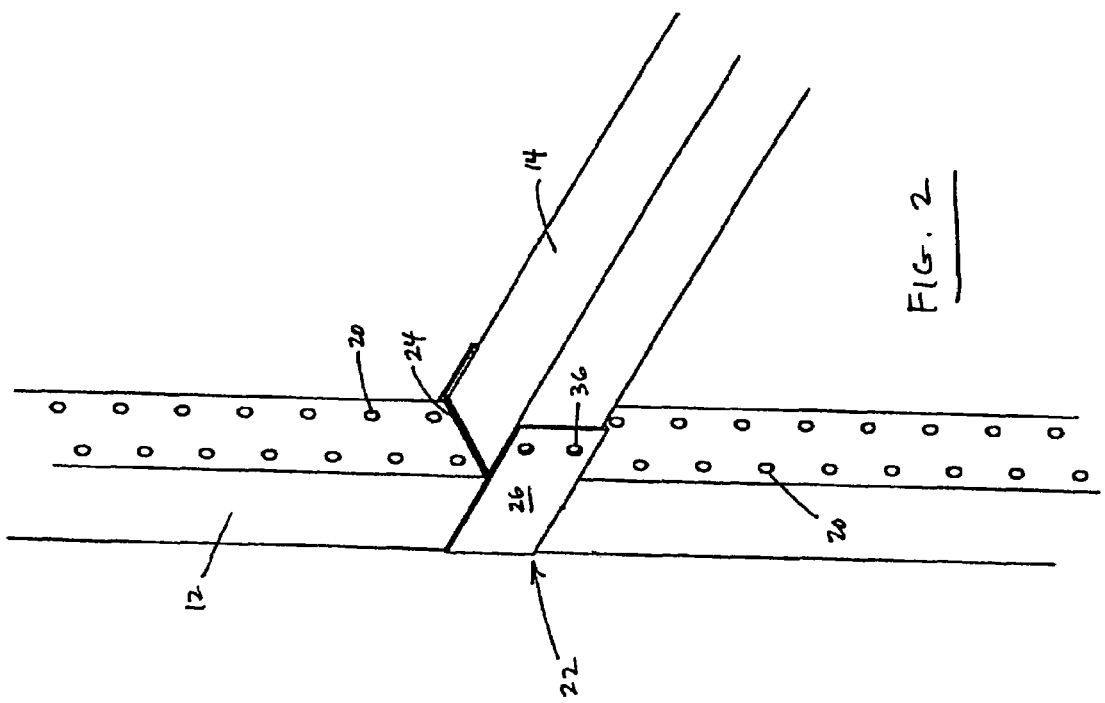
FIG. 2 is a perspective view of a cross brace coupled to one of the vertical support columns using a connector.

Referring to FIGS. 2 and 3, the vertical support columns 12 can include a plurality of conventional indexing holes 20. The indexing holes 20 can be used to connect a plurality of shelf clips (not shown) at various locations along the vertical support column 12 to support shelves 16 at selected heights along the vertical support columns 12, as will be readily apparent to those of ordinary skill in the art.

According to the present invention, a connector 22 can be used to couple the adjustable cross brace 14 to the vertical support column 12. As best seen in FIGS. 3 and 4, the connector 22 can include a central wall 24 that extends between two lateral walls 26, dividing each lateral wall into a first portion 28 and a second portion 30. In some embodiments, the lateral walls are parallel or substantially parallel to one another, although other relative orientations of the lateral walls 26 are possible, and fall within the spirit and scope of the present invention. A floor 32 extends between the second portions 30 of the lateral walls 26 to form with the second portions 30 of the lateral walls 26 a second receiving space 34 in which the cross brace 14 can sit. The floor 32 and second portions 30 of the lateral walls 26 can define any shape capable of receiving the cross brace 14, such as a pocket as illustrated in the embodiment of FIGS. 1-8. Opposite the second receiving space 34, the first portions 28 of the lateral walls 26 can extend to create a first receiving space 33 that engages the vertical support column 12.

As best seen in FIG. 2, with the cross brace 14 positioned in the second receiving space 34 of the connector 22, bolts (not shown) can be inserted through two bolt holes 36 in the second portions 30 of the lateral walls 26 of the connector 22. The bolts can extend through the two bolt holes 36 in the connector 22 and through cooperating bolt holes 38 (see FIG. 3) in the end of the cross brace 14. Either or both portions 30 of the lateral walls 26 can have any number of holes 36 having any size and shape suitable for receiving bolts, screws, pins, or other fasteners in order to couple the connector 22 to the cross brace 14.

With reference now to FIG. 5, the connector 22 can includes a pair of projections 40 that extend from the central wall 24 into the first receiving space 33 formed between the first portions 28 of the lateral walls 26. Referring also to FIGS. 2 and 3, the vertical support column 12 can be positioned in the first receiving space 33 of the connector 22 with the projections 40 inserted into any pair of the indexing holes 20 selected along the height of the vertical support column 12. In this way, the connector 22 can be positioned in multiple locations along the height of the vertical support column 12 as desired and, thus, provides an adjustable location in which the cross brace 14 can be supported. With the projections 40 of the connector 22 plugged into indexing holes 20 of the vertical support column 12, as shown in FIG. 2, and the end of the cross brace 14 positioned in the second receiving space 34 of the connector 22, the projections 40 of the connector 22 are prevented from backing out of, or otherwise dislodging from, the indexing holes 20. The projections 40 cannot be dislodged from the indexing holes 20 until the cross brace 14 is first removed from the connector 22 (e.g., unbolted from the connector 22 and lifted up and out of the second receiving space 34, in some embodiments). With the cross brace 14 bolted to the connector 22, a semi-permanent connection between the cross brace 14 and the vertical support column 12 is created, allowing for adjustability, but providing desired rigidity.

Although the connector 22 illustrated in FIGS. 2-8 has two projections 40 adapted to extend into indexing holes 20 in a vertical support column 12, any other number of projections 40 can instead be employed for this purpose. For example, a single projection 40 can extend from the central wall 24 for insertion into an indexing hole 20 in a vertical support column. Connectors 22 having such a configuration can be useful for connection to vertical support columns 12 each having only a single indexing hole 20 into which a projection 40 can extend at any given height along the vertical support column 12. Alternatively, such connectors 22 can be coupled to other vertical support columns 12 each having two or more indexing holes 20 at a given height along the vertical support column 12. As another example, the connectors 22 in some embodiments have three or more projections 40 extending from the central wall 24.

The projections 40 extending from the central wall 24 in the illustrated embodiment are located at substantially the same elevation when the connector 22 is coupled to a vertical support column 12 as described above. However, projections 40 can extend from different vertical positions when the connector 22 is coupled to a vertical support column 12. The projections 40 of such connectors 22 can be received within two or more indexing holes 20 located at different vertical positions on the vertical support column 12.

In the embodiment of the present invention illustrated in FIGS. 1-8, a cross brace 14 is received within and is supported by the connector 22. However, in other embodiments, the connector 22 can be used to support and connect a shelf 16 directly to the vertical support columns 12 without the need for a cross brace 14. As shown in FIGS. 9 and 10, for example, the shelf 106 has one or more portions (only one of which is shown in FIGS. 9 and 10), each of which is shaped to be received within a second receiving space 134 of the connector 122. The connector 122 can have any of the same features and elements (and alternatives thereto) described above with reference to the connector 22 illustrated in FIGS. 1-8. For example, the connector 122 illustrated in FIGS. 9 and 10 includes a receiving space for the vertical support column 112, lateral walls 126, and a central wall 124 dividing each lateral wall 126 into a first portion 128 and a second portion 130. Like the cross brace 14 described above, the shelf 106 can have one or more fastener holes 138 for receiving fasteners (not shown) passed through fastener holes 136 in the second portions 130 of the lateral walls 126, and can have projections 140 (not visible in FIGS. 9 and 10) for coupling the connector 122 to a vertical support column 112. Accordingly, in those embodiments of the present invention in which the shelf 106 is connected to a support column 112 without the use of a cross brace, the shelf 116 can be configured to fit in portion 132 of the connector 122 in a manner similar to that described above for the cross brace 114, and can be bolted to the connector 122 in some embodiments.

The foregoing description of the present invention has been presented for purposes of illustration and example. Furthermore, the description is not intended to limit the invention to the forms disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A one-piece homogenous connector removably coupling at least one of a cross brace and a shelf to a vertical support including a surface having a plurality of vertically aligned pairs of holes, the one-piece connector comprising:

a central wall oriented parallel to the surface of the vertical support;

two continuous lateral walls extending from the central wall at opposite edges of the central wall, each continuous lateral wall being substantially perpendicular to the central wall and being divided into first and second portions by the central wall;

a pair of parallel cylindrical projections extending from the central wall into a receiving space formed at least in part by the first portions of the continuous lateral walls, the projections being slidably positionable in any one pair of the plurality of pairs of holes in the vertical support to adjust a vertical height of the connector relative to the support;

two pairs of fastener holes, one pair in each of the second portions of the continuous lateral walls, the two pairs of fastener holes being substantially aligned along an axis substantially perpendicular to the continuous lateral walls and receiving fasteners coupling the connector to the at least one of the cross brace and the shelf; and a fourth wall extending between the second portions of the two lateral walls to at least partially define a second receiving space therewith.

2. The connector as claimed in claim 1, wherein the cylindrical projections are located at substantially the same height when the connector is installed on the support.

* * * * *